UNITED STATES PATENT OFFICE.

WILLIAM A. McADAMS, OF NEW YORK, N. Y.

METHOD OF CASTING ALUMINIUM ALLOYS.

SPECIFICATION forming part of Reissued Letters Patent No. 11,790, dated November 14, 1899.

Original No. 635,054, dated October 17, 1899. Application for reissue filed October 23, 1899. Serial No. 734,585.

*To all whom it may concern:*

Be it known that I, WILLIAM A. McADAMS, a citizen of the United States, and a resident of the city of New York, borough of Brooklyn, in the State of New York, have invented a new and useful Improvement in Methods of Casting Aluminium Alloys, of which the following is a specification.

My invention relates to an improvement in the method of casting aluminium alloys composed of aluminium and zinc and in which the metal aluminium predominates.

Aluminium when melted cools slowly, so slowly that other metals which are present in molten state in the molten aluminium are permitted to segregate and form large crystals before the slowly-cooling aluminium checks to any considerable degree their segregation and crystallization, thereby materially reducing the strength of the casting. Furthermore, the zinc, because of its greater specific gravity, has a tendency to fall toward the bottom of the molten mass, and thus render the casting non-homogeneous.

The object of my present invention is to prevent such segregation, crystallization, and stratification of the mixture during the process of the cooling and thereby add material strength to the casting.

In an alloy composed of sixty-six and two-thirds per cent. aluminium and thirty-three and one-third per cent. zinc or similar alloys in which the aluminium forms a greater part of the alloy the hereinbefore-described segregation, crystallization, and stratification of the commingled metals will be liable to take place unless the molten mass is cooled so rapidly after pouring as to check the segregation and stratification before it can have proceeded to any great extent.

By means of numerous experiments I have found that the cooling should take place rapidly within certain well-defined practical limits and that the heat should be taken from the molten mass at as nearly a uniform rate as possible. This may be accomplished when the casting is thin or small by using a metal mold of sufficient thickness to quickly remove the heat from the casting, and when the casting is to be thick or large the mold may be surrounded by a cooling medium to assist it in removing the heat with the required speed and uniformity.

To carry out my process successfully, assuming the casting to be a solid sphere one and one-half inches in diameter the heat should be removed from the casting as rapidly as at the rate of one-fifth of a calory per second, and, on the other hand, it should not be removed more rapidly than at the rate of two calories per second, as when removed more rapidly than this rate the sudden chill is found to produce the same weak structure that is produced when the heat is removed at a rate less than one-fifth of a calory per second. The best results are obtained by removing the heat at the rate of from one to one and one-tenth calories per second, a rate much more rapid than is common in the ordinary use of metallic molds. For castings of different weights and forms a corresponding rate of cooling should be observed. I find that this treatment of aluminium alloys in which the aluminium forms the greater part of the alloy will increase the strength of the casting eighty per cent. or more.

What I claim is—

The method of casting alloys containing aluminium and zinc, in which the aluminium predominates, consisting in rapidly removing the heat from the molten mass at a rate corresponding to not less than one-fifth of a calory per second for a solid spherical casting one and one-half inches in diameter, viz; more rapidly than has heretofore been common in the ordinary use of molds, thereby preventing the segregation of the metals and the formation of large crystals, substantially as set forth.

In testimony that I claim the foregoing as my invention I have signed my name, in the presence of two witnesses, this 19th day of October, 1899.

WILLIAM A. McADAMS.

Witnesses:

FREDK. HAYNES,

C. S. SUNDGREN.